United States Patent
Pesik

(10) Patent No.: US 6,953,254 B2
(45) Date of Patent: Oct. 11, 2005

(54) SILICON WAFER BASED MACROSCOPIC MIRROR FOR WIDE ANGLE SCANNING APPLICATIONS

(75) Inventor: Joseph T. Pesik, Eagen, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 10/921,522

(22) Filed: Aug. 19, 2004

(65) Prior Publication Data

US 2005/0018329 A1 Jan. 27, 2005

Related U.S. Application Data

(60) Division of application No. 10/611,631, filed on Jul. 1, 2003, which is a continuation-in-part of application No. 10/056,199, filed on Jan. 24, 2002, now abandoned.

(51) Int. Cl.$^7$ ................................................. G02B 5/08
(52) U.S. Cl. ........................................ 359/883; 359/224
(58) Field of Search ................................ 359/883, 838, 359/223, 224

(56) References Cited

U.S. PATENT DOCUMENTS

| | | | |
|---|---|---|---|
| 6,201,629 B1 * | 3/2001 | McClelland et al. | 359/223 |
| 6,379,510 B1 * | 4/2002 | Kane et al. | 204/192.34 |
| 6,387,466 B1 * | 5/2002 | Fusegawa et al. | 428/64.1 |
| 6,426,013 B1 * | 7/2002 | Neukermans et al. | 216/24 |
| 2003/0137759 A1 | 7/2003 | Pesik | |

FOREIGN PATENT DOCUMENTS

| | | |
|---|---|---|
| EP | 1225 469 A | 7/2002 |
| WO | WO 02/059942 A | 8/2002 |

OTHER PUBLICATIONS

Article "Electrostatic Micromirros for Subaperturing in an Adaptive Optics System", Mark N. Horenstein et al., Journal of Electronics 54 (2002) pp. 321–332.
International Search Report from PCT/US2004/014359.

* cited by examiner

Primary Examiner—Euncha P. Cherry
(74) Attorney, Agent, or Firm—David R. Perclo, Esq.; Calfee, Halter & Griswold LLP

(57) ABSTRACT

A macroscopic mirror for wide angle scanning applications comprises: a silicon substrate section of a predetermined shape and macroscopic size cut from a silicon wafer comprising a flat, polished surface side and an etched, rough surface side; and a plurality of layers, including a layer of reflective medium, disposed on the flat, polished surface of the substrate section in such a manner to minimize flexural distortion of the flat surface. The macroscopic mirror is made by a method comprising the steps of: preparing the silicon wafer by polishing one side to a predetermined flatness and etching the other side to a predetermined roughness; cutting the substrate section from the prepared silicon wafer to a predetermined shape and macroscopic size; and applying the plurality of layers on the flat, polished surface. The macroscopic mirror is included in a mirror system wherein the rough surface side is bonded to supporting arms of a drive mechanism which scans the mirror at a predetermined scanning rate in at least one plane of rotation.

6 Claims, 4 Drawing Sheets

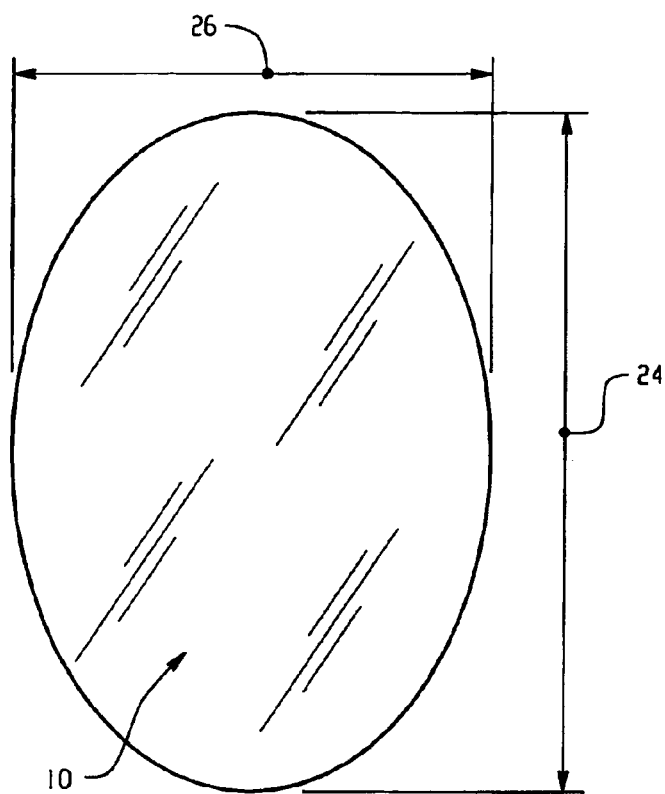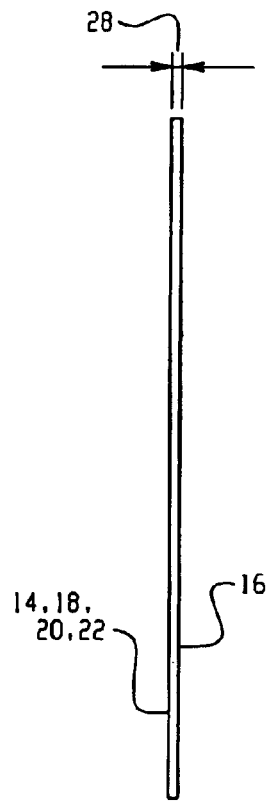
Fig. 3A        Fig. 3B
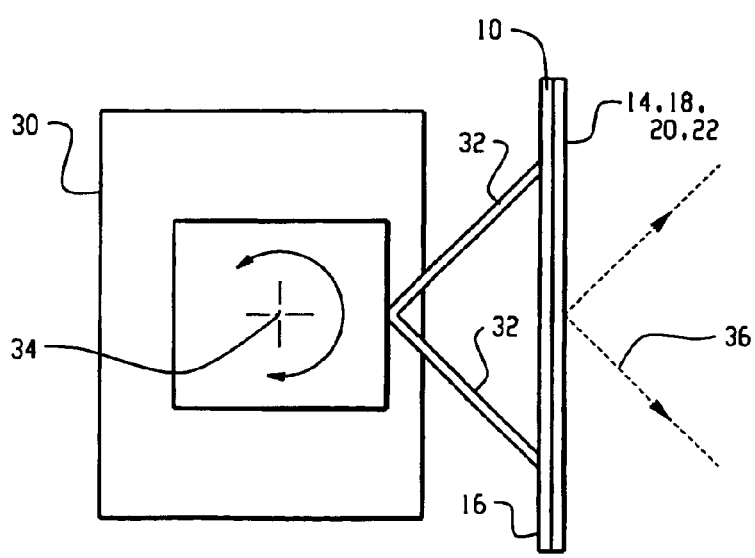
Fig. 4

SILICON WAFER BASED MACROSCOPIC MIRROR FOR WIDE ANGLE SCANNING APPLICATIONS

This application is a divisional application of U.S. patent application Ser. No. 10/611,631, filed Jul. 1, 2003, which is a continuation-in-part application of U.S. patent application Ser. No. 10/056,199, entitled "Silicon Wafer Based Rotatable Mirror" and filed Jan. 24, 2002 now abandoned, which is incorporated by reference herein in its entirety.

BACKGROUND OF THE INVENTION

The present invention relates to precision macroscopic optical mirrors for scanning applications, in general, and more particularly to a Silicon wafer based macroscopic mirror suitable for meeting the rigid specifications for wide angle scanning mirror systems.

Conventional precision macroscopic mirrors for scanning applications generally include a substrate material which has one surface highly polished and coated with a reflective medium. In operation, these precision mirrors are typically mounted to a drive mechanism, such as a resonant scanner, for example, for scanning of an optical beam incident upon the reflective medium. Common substrate materials include BK-7, Pyrex, Zerodur, Aluminum and the like, for example. (BK-7 and Zerodur are trademarks or tradenames of Schott Corporation and Pyrex is a trademark or tradename of Corning Corporation).

Desired specifications for a wide angle scanning application of a modern mirror system may include a large aperture macroscopic mirror having a reflective surface on the order of 50.8 mm by 71.8 mm, operated at a scanning frequency which may be approximately 100 Hz to direct a large diameter laser beam on the order of at least 20 mm over an optical scan angle of 30° to 40° peak to peak, for example. Preferably, the optical scan is a raster scan type. In some applications, the mirror may perform a dual function as a receiving optic for receiving the backscatterings of the laser beam from objects in its path. For this purpose, it is desirable that the mirror surface have a nearly 100% fill factor, i.e. ratio of usable area to total area of receiving surface.

To meet these specifications, the mirror substrates should be lightweight and highly resistant to deflection. This resistance is measured by a specific stiffness value ($E/\rho$), i.e. Young's Modulus divided by mass density (rho). The required stiffness for the conventional substrates noted above is generally achieved with a high thickness to diameter ratio, but this results in undesirable added mass to the mirror. This added mass has an impact on the scan drive requirements of the drive mechanism, the attainable resonant frequency of the mirror, and the overall optical system architecture in both cost and weight.

In some applications, such a wide angle mirror system is intended for use in an aircraft environment wherein the precision macroscopic mirror thereof would encounter substantial temperature extremes during flight profiles. In these applications, it is desirable to have a mirror that is highly resistant to thermal distortion over a wide operating temperature range. In addition, the reflective surface of these precision mirrors may need to take upon a variety of profiles based on the particular application. The current substrate materials noted above are not easily and/or inexpensively shaped for different applications. For example, to reshape a standard glass substrate from a simple circular shape to an elliptical shape, a basic solid glass cylinder is often sectioned at a forty-five degree (45°) angle which causes the sides to be beveled. This can make it more difficult to effectively balance and mount the elliptically shaped mirror to the drive mechanism since the center of mass of the mirror will not coincide with the desired rotational center of the reflective surface.

Accordingly, for wide angle scanning applications, it is desirable to have a precision macroscopic mirror with a substrate material that is readily available and can be easily and inexpensively altered in shape. It is also desirable to have such substrate material include high strength and low weight characteristics and offer good resistance to thermal distortion over wide operating temperature ranges. Such properties in a mirror can minimize the scan drive requirements and overall optical system architecture, rendering a lighter weight and more cost-effective optical system than what currently exists.

It is known to use Silicon as a substrate material for microscopic optical mirror applications, such as fiber optic telecommunication switching, for example. An example of the use of Silicon as a mirror substrate for microscopic optical applications is disclosed in the U.S. Pat. No. 6,379,510, entitled "Method of Making A Low Voltage Micro-Mirror Array Light Beam Switch", filed on Nov. 16, 2000 and issued Apr. 30, 2002 to Kane et al. (hereinafter "Kane"). Kane describes a light beam optical switch for fiber optic telecommunications wherein a micro-mirror can be used to reflect light from a fiber entering the switch junction to a targeted fiber for continuation of the light signal to its appropriate destination (column 2, line 3). Kane's optical micro-mirror switch is fabricated using micro-electro-mechanical systems(MEMs) techniques. Light into and out of a fiber would likely be on the order of 1 mm diameter maximum (may be much smaller) during the time of contact with the mirror. Presumably, the individual micro-mirror of Kane would be slightly larger in size than the directed beam. The U.S. Pat. No. 5,903,380 Motamedi, et al (referenced by Kane) describes a MEMs optical resonator wherein all components fit into a common TO-8 semiconductor housing which is considered quite small. Other patents directed to MEMs fabricated micro-mirror systems refer to a large micro-mirror size as being in the range of 200 um×200 um to 2 mm×2 mm. As a result, MEMs micro-mirror devices are typically developed in a mirror array format.

Kane discusses using an array of micro mirrors tightly packed together (see column 11, line 50). As an optical receive mirror, the larger size effected by the mirror array provides a much greater collection area for better collection efficiency. However, the critical fill factor of such an array of separate MEMS fabricated micro-mirrors pursuant to Kane, for example, would be substantially less than 100%. There would still be considerable loss of collection light due to reduced mirror coverage across the area covered by the array, specifically due to spaces between the micro-mirrors (even if these mirrors are hexagonal and nested as per Kane column 11, line 50) and area taken up by micro-mirror actuation components.

Kane further describes (see Column 4, line 30) an optical network switching frequency of speeds approaching 1 kHz. Often, MEMs micro-mirror devices that operate at these frequencies can attain a deflection angle of no more than a few degrees. The physical construction of the MEMs actuator, designed to meet other criteria, is often a limiting factor to the attainable scan angle. Typically, there is a design trade-off between scan frequency, scan angle and mirror size. For example, in the paper "Electrostatic micro torsion mirrors for an optical switch matrix" by Toshiyoshi et al., Microelectromechanical Systems, 1996, pp. 231–237 which was referenced in the U.S. Pat. No. 6,201,629, a scanner micro-mirror of dimensions 400 um×400 um×30 um, considered to be a relatively large mirror on the micro scale, could deflect over an angle of about 30°, but was limited to a scanning frequency of 75 Hz due to thinness requirements in the torsion members. This scanning frequency is considerably less than that specified for the desired system, principally due to shortfalls of the support structure.

In addition, MEMs micro-mirror devices which utilize silicon as their mirror substrate typically incorporate their actuation system components directly into the same substrate through more extensive and complex microfabrication techniques, i.e. photolithography, micro-etching, thin film deposition, for example. Kane (at Column 3, line 21 and Column 10, line 37) discloses the use of thin films and micro-fabrication methods with a design (see Column 3, line 44) wherein the hinges and supporting structure are located underneath the mirror and actuators are fabricated of the same material. In general, Kane's process (see Column 7, line 41) forms an extremely thin optical switch, whereby the components are essentially coplanar. Support components and a piezoelectric layer are deposited on top of the base layer in separate phases. Specific areas are then etched away to leave the actuators and support structure and finally a mirror surface area. This surface is then deposited with a reflective coating. A separate integrated drive circuit (chip) may be bonded to the optical switch to provide a functional unit. Specifically, Kane's process (see Column 10, line 37) involves 10 major steps (with other smaller steps imbedded) for micro-fabrication that start with a small silicon wafer substrate and end up with a compact array of micro-scanners that can be packaged with its own CMOS-compatible driving circuit creating a very small form factor (see Column 11, line 45).

Ostensibly, silicon based micro-mirror devices made by micro-fabrication techniques, like MEMs, for example, will not meet the desired specifications for a wide angle scanning application of macroscopic mirror system. Accordingly, the present invention overcomes the drawbacks of such silicon based micro-mirror devices and offers a macroscopic mirror suitable for use in a mirror system which meets the desired specifications for wide angle scanning applications.

SUMMARY OF THE INVENTION

In accordance with one aspect of the invention, a macroscopic mirror for wide angle scanning applications comprises: a silicon substrate section of a predetermined shape and macroscopic size cut from a silicon wafer comprising a flat, polished surface side and an etched, rough surface side; and a plurality of layers, including a layer of reflective medium, disposed on the flat, polished surface of the substrate section in such a manner to minimize flexural distortion of the flat surface.

In accordance with another aspect of the present invention, a method of making a macroscopic mirror for wide angle scanning applications comprises: preparing a silicon wafer by polishing one side to a predetermined flatness and etching the other side to a predetermined roughness; cutting a substrate section from the prepared silicon wafer to a predetermined shape and macroscopic size; and applying a plurality of layers, including a layer of reflective medium, on the flat, polished surface of the substrate section in such a manner to minimize flexural distortion of the flat surface.

In accordance with yet another aspect of the present invention, a mirror system for wide angle scanning a radiation beam comprises: a macroscopic mirror comprising: a silicon substrate section of a predetermined shape and macroscopic size cut from a silicon wafer, the substrate section comprising a flat, polished surface side and an etched, rough surface side; and a plurality of layers, including a layer of reflective medium, disposed on the flat, polished surface of the substrate section in such a manner to minimize flexural distortion of the flat surface; a mirror drive mechanism including a plurality of supporting arms; and wherein the rough surface side of the macroscopic mirror being bonded to the supporting arms of the drive mechanism, the mirror drive mechanism for scanning the macroscopic mirror at a predetermined scanning rate in at least one plane of rotation.

BRIEF DESCRIPTION OF THE DRAWINGS

FIGS. 3A and 3B illustrate front and side views, respectively, of an elliptical macroscopic mirror section in accordance with another embodiment of the present invention.

FIG. 4 is an illustration of an exemplary wide angle scanning optical mirror system using a macroscopic mirror in accordance with another aspect of the present invention.

DETAILED DESCRIPTION OF THE INVENTION

As is well known to the semiconductor industry, Silicon wafers are used as substrates in the manufacture of semiconductor circuits. The Silicon material used for the wafers is generally made in the form of ingots which are grown by conventional processes. The Silicon ingots which are generally cylindrical in shape are sliced to yield wafers of substantially circular shape and predetermined thickness. Thus, Silicon wafers in this form are considered readily available for other applications as well. Applicant has discovered that the high strength and low weight properties of these Silicon wafers render them well suited for a substrate of a macroscopic mirror intended to meet the desired specifications for wide angle scanning applications as will become more evident from the following description.

Figure 1:
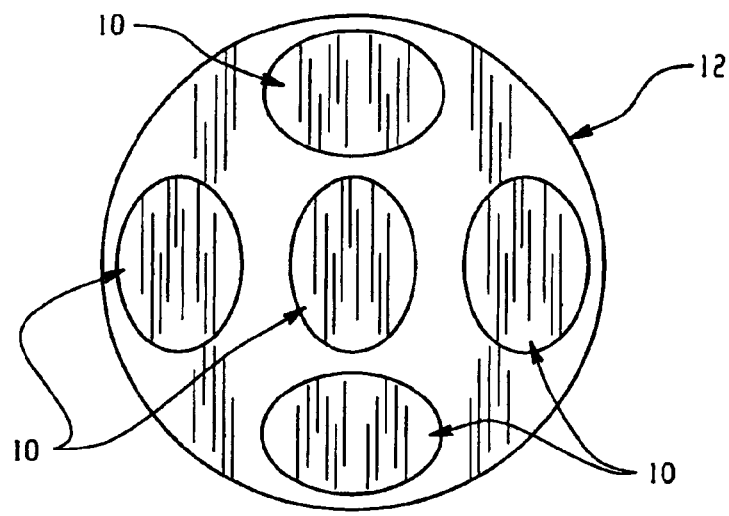
FIG. 1 is an illustration of a cutting of macroscopic substrate sections from a silicon wafer in accordance with one aspect of the present invention.

In accordance with the present invention, a substrate 10 of a macroscopic mirror may be sectioned in any desired size and shape from a silicon wafer 12 as illustrated in FIG. 1. Silicon wafers 12 are sliced from large diameter ingots pursuant to precise specifications and developed in accordance with semiconductor industry standards. Single crystal silicon is preferred for the substrate material because of its superior mechanical properties such as strength, stiffness and fatigue resistance and for its favorable thermal characteristics. In the current embodiment, the thickness of wafer 12 is specified to be less than 1 mm to ensure that target scanning frequencies of the wide angle scanning application can be attained. However, this value could be increased by nearly a factor of two, based on other application needs, pursuant to current manufacturing processes.

Figure 2A:
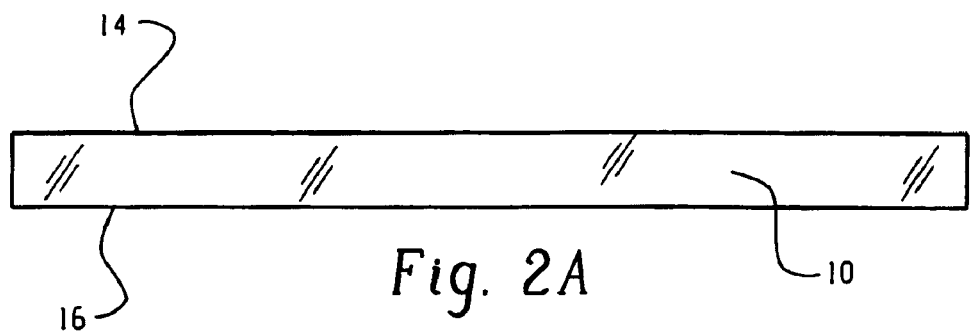
FIGS. 2A–2D illustrate steps of a process for applying layers, including a reflective medium layer, to a flat, polished surface of a substrate section in accordance with an embodiment of the present invention.

Bow or warp should be minimized in the finished wafer. Flatness is a critical parameter of the macroscopic mirror and should be maximized to preserve collimation of the laser beam and the phase front coherence for coherent wide angle scanning applications. In the present embodiment, a single surface 14 of the silicon wafer 12 is highly polished while the backside 16 is etched for roughness as shown in FIG. 2A. Roughing the backside surface 16 will enhance the bonding process of the mirror to a scanning actuation device as will become more evident from the description found herein below. Contamination or discontinuities such as streaks, smudges, tooling marks, pits, scratches or haze should not be present on the functional (polished) surface 14 to provide a uniform, highly reflective substrate. With only a highly polished (uncoated) surface 14, light reflectivity in the near IR range would approach maybe 50–60% at best. Subsequent coating may be applied to the polished surface of the silicon wafer to obtain the desired reflectivities for near IR light applications.

From the processed silicon wafers, individual macroscopic mirrors may be sectioned out, in cookie cutter fashion, with the use of laser cutting technology, for example, as illustrated in FIG. 1. In this laser cutting process, the processed silicon wafers 12 are placed on a backing plate with adhesive or similar means and the plate is positioned from an x-y orientation on the laser turret table. The machining parameters (laser power level, beam focus, feed rate, etc) should be adjusted to minimize burrs on the edge of the mirrors and eliminate splatter onto the surface of the mirrors which could cause pitting or scratching. The laser cutting process is inherently "touch free" machining and utilizes little or no special tooling to perform. It allows mirror sections of any desirable size and shape, whether elliptical as in the current embodiment as shown by the illustration of FIG. 1, or circular, triangular or rectangular or complex in nature. Any desired shape and size may be rendered by the laser cutting process with only a numerically controlled computer program change. Accordingly, each mirror section 10 cut from the processed silicon wafer 12 has a continuous reflective surface.

Once the final form of the macroscopic mirror is laser cut from the processed wafer, the polished continuous surface 14 of the mirror section 10 is coated (by sputtering or other means) with a desired reflective medium such as gold or silver in order to meet desired high reflectivity specifications exceeding 96%, approaching 98% in the near IR wavelength range. In the present embodiment, the process of coating the mirror section 10 with the reflective medium is critical. Any coating applied to the mirror section has internal stress that could induce warping of the mirror section. The stress may be tensile or compressive in nature. It is necessary to calculate the effects of the various coatings and thicknesses on the finished product. A plurality or composite of coatings may be applied to the polished surface 14 to work in concert with each other to achieve the required end product mirror flatness. The plurality of coating layers, properly applied, could approach null flexural distortion in combination with the present mirror substrate and the mounting conditions to the scanning actuator of the mirror system as will become more evident from the description found herebelow.

Figure 2B:
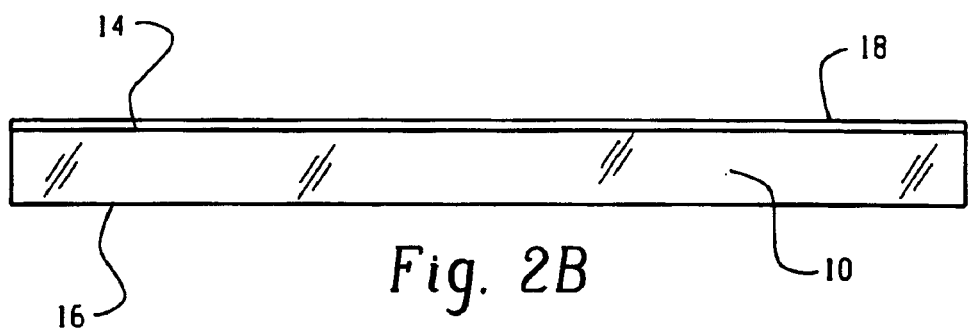
Figure 2C:
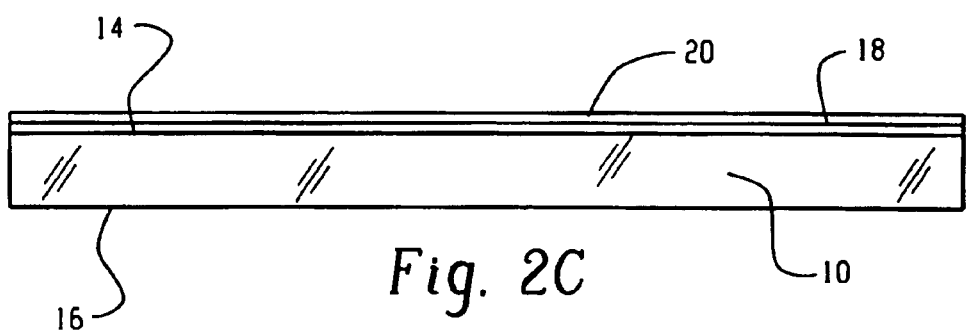
Figure 2D:
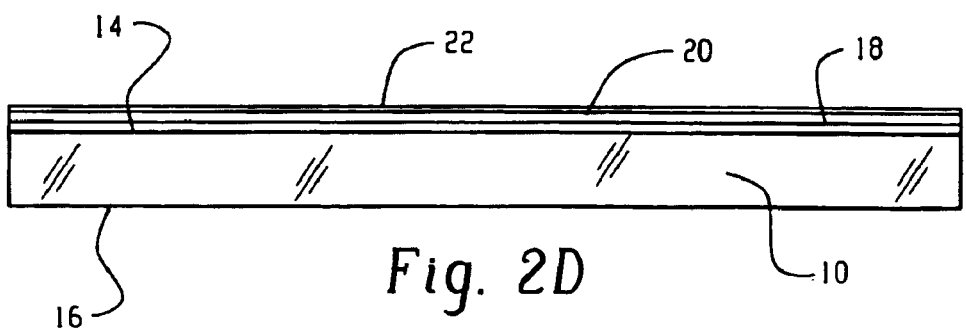

The problem of flatness is even more critical for coherent wide angle scanning applications. One way to alleviate this problem would be to thicken the substrate to make it stiffer and more resistant to bending, but the additional mass to the mirror results in a higher moment of inertia which would lower the resonant frequency. However, a thicker mirror substrate could be utilized if pocketed out in the back to provide a built-in, stiff patterned support structure that would allow the desired moment of inertia to be maintained, for example. The present embodiment comprises a simplified continuous mirror substrate thickness that is quite cost effective due to minimal processing steps as shown in FIGS. 2B–2D.

In the present embodiment, the process for coating the silicon substrate mirror section may be performed in a clean room environment to minimize contamination. In general, the mirror sections are first cleaned and then, the polished continuous surfaces 14 thereof are first coated with a "primer" layer 18, then with a reflective layer 20 and finally, with a protective coating 22 as shown in FIGS. 2B, 2C, and 2D, respectively. The desired reflective coating 20 may be gold due to its superior performance in the near IR wavelength range. One possible process recipe comprised cleaning with a plasma sputter etch, applying a 200 angstrom thick titanium adhesion layer 18, followed by a 3500 angstrom thick gold layer 20 and a 1000 angstrom thick protective coating of silicon dioxide 22. Reflectivity (near IR) of the coated surface with the aforementioned combination of layers was on the order of 93% with some visible haze present and inconsistency throughout the same batch. This process was modified to include a chemical cleaning step prior to sputter etch and coating thicknesses were varied through subsequent batches in an attempt to improve consistency. It is possible under certain conditions that the gold and titanium could start to alloy and diffuse into the silicon during the high heat application process of silicon dioxide protective coating. A suitable coating solution was achieved by an optical coating house, Rocky Mountain Instrument-Lafayette, Colo. using its proprietary process. The resultant coated macroscopic mirror section is compatible with current desired reflectivity and flatness specifications.

The total cycle time for the foregoing described process for making the mirror sections is quite low and reasonably cost effective, especially for low quantity prototype or production runs as is typical for aerospace industry applications. On the other hand, MEMs style mirrors (and integrated actuators), mainly developed for the telecommunications industry, are geared for very high quantity runs, through which the piece part pricing can be brought down to reasonable levels to justify the manufacturing expense involved in the many microfabrication techniques.

FIGS. 3A and 3B illustrate front and side views, respectively, of an elliptical macroscopic mirror section 10 made in accordance with the foregoing described process. However, it is understood that macroscopic mirror 10 may be configured into any shape and size based on its particular application. For other applications, the mirror could be round, square, rectangular, octagonal or any other imaginable shape, at virtually no increase in cost as noted above. If round or circular, the mirror may leverage the size of existing SEMI standard wafers. Virtually any shape can be readily laser cut from standard wafer diameters with only the limitation of thickness, based on the laser cutting capabilities.

As illustrated in FIGS. 2A–2D, a flat surface or functional surface 14 of the wafer substrate is polished before sectioning or laser cutting from the wafer 12. Once the final shape is achieved, the optical coating comprising a "primer" layer 18, a reflective medium 20, like gold or silver or other desirable coating, and a protective layer 22, for example, is applied to the polished functional surface 14, by sputtering or other conventional process, for example, to a predetermined thickness. The resulting macroscopic mirror 10 may have a substrate in the form of a single Silicon wafer, a composite of a plurality of bonded Silicon wafers or either of the aforementioned arrangements, the uncoated surface 16 of which acting as a backing plate for assembly to a scanning device as shown in the illustration of FIG. 4. The macroscopic mirror section 10 of the present embodiment is elliptical in shape as shown in FIGS. 3A and 3B with a major axis dimension 24 of 2.828 inches or 71.83 millimeters and a minor axis dimension 26 of 2.0 inches or 50.80 millimeters and a thickness dimension 28 of 0.028 inches or 0.71 millimeters, but it is understood that the mirror may be configured to any shape and macroscopic size to meet the specifications of a particular wide angle scanning application. The macroscopic mirror section 10 is effective in configurations of a diameter of 1–8 inches and possibly larger optical configurations and may be coated for specific wavelength or broadband applications. It may also be customized for compatibility with a variety of wide angle scanning techniques.

Materials of current macroscopic mirror substrates cannot be manipulated to any desired shape as inexpensively as the Silicon wafer based substrate, if at all. One aspect of an elliptical shaped silicon wafer based mirror is the continuous cross section thereof. That is, the sides are normal to the faces along the entire perimeter. For standard glass substrates, for example, an elliptical shape is often developed by cutting a solid glass cylinder at a 45° angle which causes the sides to be beveled. This can make it more difficult to effectively balance and mount the elliptically shaped mirror to the drive mechanism since the center of mass of the mirror may not coincide with the desired rotational center of the reflective surface.

The Silicon wafer based macroscopic mirror of the present embodiment is highly resistant to deflective distortions, having a Specific Stiffness (E/$\rho$), that is Young's Modulus divided by density (rho), on the order of 1.5–2.5 times better than BK-7, Zerodur, Aluminum and other similar precision mirror substrate materials. Consequently, the macroscopic mirror 10 has a lower acceptable thickness to diameter ratio than the current standard mirror designs. This weight and profile reduction is critical in dynamic optical scanning applications to minimize scan drive mechanism requirements and overall optical system architecture. The Silicon wafer based macroscopic mirror of the present embodiment is also very resistant to thermal distortion, having a Thermal Distortion Coefficient on the order of 0.020–0.032 which is better than Zerodur and one to two orders of magnitude better than Aluminum, BK-7 and other similar materials. This property provides a macroscopic mirror with much greater resistance to the negative impact of substantial temperature extremes, like those encountered in aircraft flight profiles, for example.

Accordingly, the resulting macroscopic mirror section 10 will meet the desired operating specifications of approximately 100 Hz operating frequency and scanning angles of no less than 30° peak to peak. The operating frequency is a function of mirror mass, i.e. moment of inertia. The larger the mass, the lower the resonant frequency. If the processes taught by Kane were directed toward development of a macroscopic mirror of the present embodiment's desired size, the operating frequency would drop substantially. Regardless, it would quickly prove itself to be unreasonable and quite impossible to manufacture. In addition, the MEMs actuation method taught by Kane would be unable to physically function in accordance with the desired operating specifications. Particularly, the spring technique would be insufficient.

In Kane, the beginning wafer thickness would have to be much greater than standard wafer thicknesses in order to accommodate room for the angular deflection of the desired specifications, which it could not realistically reach anyway with current MEMs actuation methods. In other words, no scanning mirror systems utilizing a silicon substrate mirror with the present embodiment's mirror size could have been produced by MEMs processing methods and to meet the desired combination of scan angle, operating frequency and the other specifications identified herein. The stress on the integrated cantilevers would be far too great, and the entire device would be undesirably bulky in order to provide the clearance for the mirror at the limits of deflection. It would not be economically feasible for low quantity production runs as is typical for the aerospace industry.

Thus, the macroscopic mirror 10 is well suited for use in a wide field scanning optical mirror system on board an aircraft wherein the mirror 10 may be assembled to and rotated by a mirror drive or actuation mechanism 30 as shown in the illustration of FIG. 4. In the present embodiment, the mirror drive mechanism 30 comprises an off-the-shelf resonant scanner, which may be of the type manufactured by Lasesys Corporation, for example. In the embodiment of FIG. 4, the back surface 16 of the mirror 10 is coupled to supporting arms 32 of the mechanism 30 thus keeping exposed the reflective medium of the surface 14. The drive mechanism 30 may be operated in a plane of rotation about an axis 34 appearing perpendicular to the page. The drive mechanism 30 may be also operated to rotate the mirror 10 other about one or more other axes, if needed. In this configuration, a light beam 36 may be raster scanned by the mirror system. The reflective medium of the surface 14 may be selected for an at least one wavelength of the radiation 36 raster scanned thereby. Accordingly, the surface 14 may be coated with layers 18, 20 and 22 as noted above for specific wavelength transmission or broadband coated.

Figure 5:
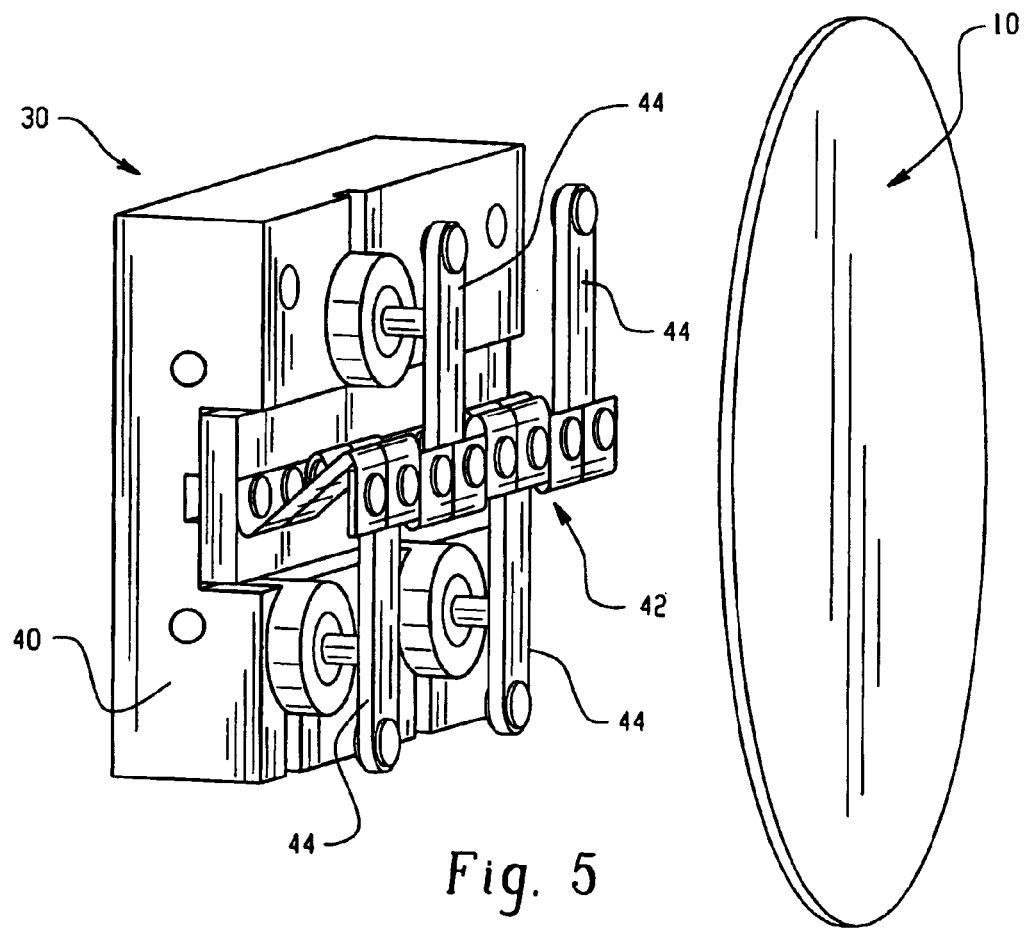
FIG. 5 is an exploded view of an exemplary mirror drive mechanism and an unbonded macroscopic mirror.
Figure 7:
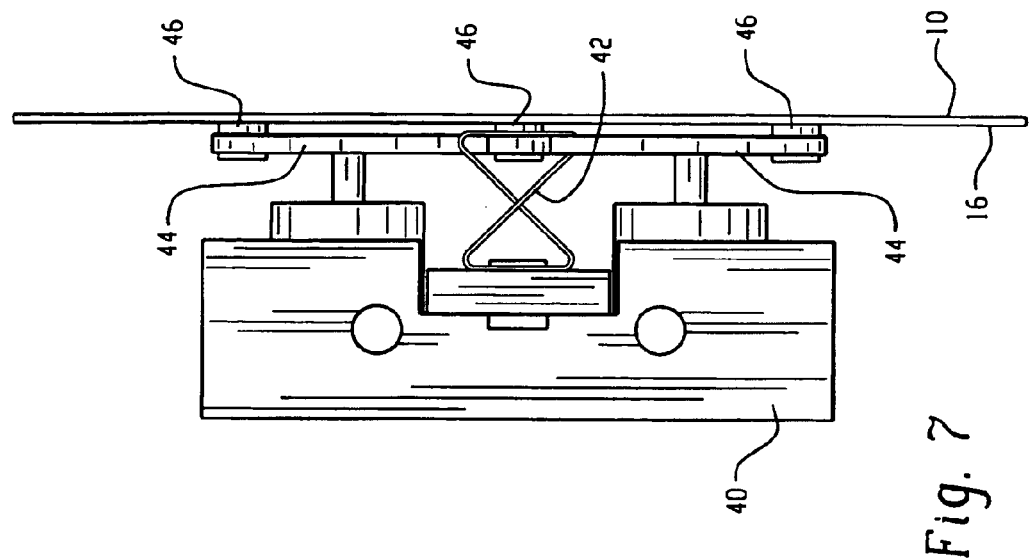
FIGS. 6 and 7 are isometric and side views, respectively, of a wide angle scanning optical mirror system comprising a macroscopic mirror being bonded to a resonant scanner suitable for embodying another aspect of the present invention.
Figure 6:
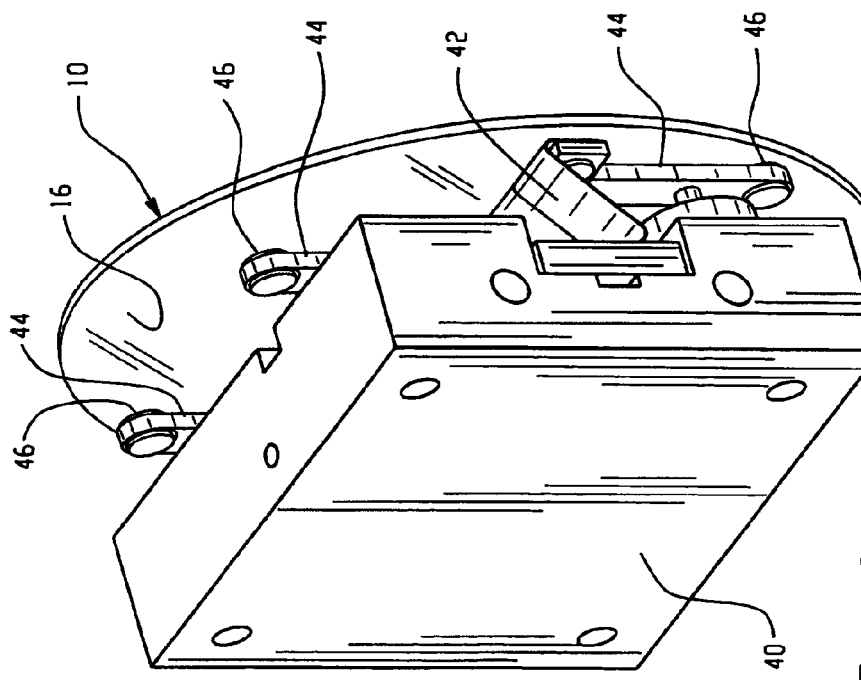

The resonant scanner developed by Lasesys Corporation (Santa Rosa, Calif.) was chosen for the present embodiment because it is a robust, compact, low cost device that could provide position feedback, scan pattern and optical scan angle to meet the desired specifications for wide angle scanning applications. More specifically, as shown in the exemplary illustration of FIG. 5, this scanner 30 comprises a base structure 40, spring mechanism 42 and a separate "bulk" or macroscopic mirror 10 that can be produced in accordance with the process noted above independent of the actuation device 30 and then secured to the actuation device 30 as shown in the FIGS. 6 and 7 based on specific wide angle scanning applications. The resonant scanner 30 inherently performs a sinusoidal scan, which has proven stability that eliminates scan amplitude jitter for increased consistency. The mechanical noise and vibration from this scanner is low due to Lasesys' patented S-Flex™ mirror suspension system, which provides a quieter and more vibration free environment, as required.

The Lasesys scanner is typically sold with a standard glass mirror deflector of dimensions 18 mm diameter×1 mm thick, which is much smaller than the elliptical macroscopic mirror of dimensions 50.8 mm×71.8 mm. In its typical configuration, the scanner operated at approximately 400 Hz. Upon replacing the standard glass mirror with a glass mirror of the same size as the macroscopic mirror 10, the scanner was limited to operating at only approximately 50–60 Hz which was considerably short of the 100 Hz target frequency. The larger mass of the glass mirror resulted in a moment of inertia that was too large for the scanner drive system. Several attempts at experimenting with various conventional macroscopic mirror substrates failed. The limiting factor in all cases was mirror mass. For a given footprint, the only geometric variable is material thickness. Mirror substrates typically adhere to a minimum thickness to diameter ratio for proper stiffness and strength so that bending or breakage do not occur during the scanning process. Bending of the mirror should be minimized to preserve collimation of the laser beam and the phase front coherence for coherent wide angle scanning applications.

The present embodiment includes a deflector that resolves the glass mirror problem so that the target frequency of approximately 100 Hz can be achieved. The macroscopic mirror 10 is assembled to the actuation device 24 utilizing actuation mirror support arms 44 that ride on top of the pivoting spring system 42. A high strength, durable epoxy is used to bond the back surface 16 of the silicon wafer section 10 to pads 46 disposed at the centers and/or ends of the arms 44. Care should be taken in this bonding step so as not to induce stress on the silicon substrate and cause curvature to the mirror 10, which could, again, have negative impact on the beam pattern in coherent beam applications. In the present mirror system embodiment, an "off-the-shelf" Lasesys resonant scanner model is modified slightly to accommodate the macroscopic sized mirror 10. Slight modification of the springs 42 and mirror support structure 44 to which the macroscopic mirror is bonded enabled the scan angle to meet the desired specifications and actually exceed them by 7–8° peak to peak. All of the desired specifications for the wide angle scanning mirror system were met by the present mirror system embodiment.

The macroscopic silicon wafer based mirror of the present embodiment has the mechanical properties that allow a thinner (0.7–0.75 mm) cross section (from 30 to several hundred percent thinner than conventional mirrors) to be utilized for the given macroscopic footprint. This silicon based macroscopic mirror is highly resistant to deflective distortions—having a Specific Stiffness (E/$\rho$)-Young's Modulus divided by density (rho)—on the order of 1.5–2.5 times better than BK-7, Zerodur, Aluminum and other leading optical quality mirror substrate materials typically used in non-MEMs, i.e. macroscopic applications. This weight and profile reduction is critical in dynamic scanning scenarios to minimize scan drive requirements and overall system architecture. This mirror is also quite resistant to thermal distortion-having a Thermal Distortion Coefficient on the order of 0.020–0.032. This is better than Zerodur and one to two orders of magnitude better than aluminum, BK-7 and others. This allows much greater resistance to the negative impact of substantial temperature extremes encountered in aircraft flight profiles, for example.

The reduced mass of the macroscopic mirror 10 allows the drive mechanism 24 to attain a higher target operating frequency while providing a sufficiently large, continuous reflective surface 12. Similar face-area mirrors manufactured from contemporary optical substrates such as Pyrex, BK7, Aluminum and Zerodur would be provided with a considerably thicker cross-section to maintain strength and flatness. This additional mass would not allow the drive mechanism to reach the target operating frequency. This is a credit to the higher specific stiffness of Silicon substrate compared to these other materials.

Silicon wafer based mirrors may be suitable for static applications as well. The Silicon wafer mirror could be kinematically bonded to some structure or to other wafers to increase overall thickness.

As noted above, flatness properties of the mirror should be also considered, based on the mirror's application. Flatness is usually identified in terms of wavelengths. One configuration of the macroscopic mirror 10 according to the present embodiment has been measured to have approximately a 3 lambda flatness over the major axis of the mirror at 633 nanometers (nm), which equates to a 1.2 lambda flatness at 1550 nm, for example. This flatness is sufficient for non-coherent wide field scanning applications and possibly imaging applications. However, tighter flatness specifications would be accommodated as noted above for coherent applications as well.

Operating loads to the elliptical mirror 10 in the mirror system application of FIG. 4 were analyzed by Finite Element Analysis and the results indicated a Silicon wafer yield stress of two to twenty times greater than the actual induced stress on the mirror 10 in the wide field scanning application. This range in safety factor is due to the variables in different Silicon wafer lattice structures and manufacturing processes. Accordingly, appropriate specifications for the wafer could control this for any specific mirror application. Also, the mirror system of FIG. 4 was vibration tested to reasonable energy levels for some current helicopters. The mirror performed well during random vibration at levels up to and including 0.020 g^2/Hz and then during a sine sweep from 10–500 Hz with a 2 g peak. Mil-Std-810E, Environmental Test Methods, and RTCA/DO-160, Environmental Conditions and Test Procedures for Airborne Equipment, served as a reference these test procedures.

The mirror system of FIG. 4 was thermally cycled, while not operating, between –55° C. and +85° C. for two complete cycles and while operating, between –40° C. and +60° C., for two cycles. Each test involved ramping at 5° C./minute, stabilizing at the desired temperature extreme for 1.5 hours and then ramping to the next extreme. The mirror 10 itself showed no degradation as a result of this testing. These temperature limits are standard for military aircraft applications. Mil-Std-810E was used as the testing basis.

Accordingly, the high strength and low weight properties of the Silicon wafer based macroscopic mirror 10 of the present embodiments provide positive reliability impact through reduced drive mechanism load requirements and overall optical system mass reduction. The high availability and ease of configurability of the Silicon wafers ensures the macroscopic mirror of the present embodiment to be a cost-effective replacement to conventional optical macroscopic mirrors at a fraction of the weight.

While the present invention has been described by way of example in connection with one or more embodiments herein above, it is understood that such embodiments should in no way, shape or form limit the present invention. Rather, the present invention should be construed in breadth and broad scope in accordance with the recitation of the claims appended hereto.

What is claimed is:

1. A mirror system for wide angle scanning a radiation beam, said system comprising:
   a macroscopic mirror comprising:
      a silicon substrate section of a predetermined shape and macroscopic size cut from a silicon wafer, said substrate section comprising a flat, polished surface side and an etched, rough surface side; and
      a plurality of layers, including a layer of reflective medium, disposed on the flat, polished surface of said substrate section in such a manner to minimize flexural distortion of said flat surface;

a mirror drive mechanism including a plurality of supporting arms; and wherein the rough surface side of said macroscopic mirror being bonded to said supporting arms of the drive mechanism, said mirror drive mechanism for scanning said macroscopic mirror at a predetermined scanning rate in at least one plane of rotation.

2. The system of claim 1 wherein the macroscopic mirror is bonded to the supporting arms of the drive mechanism in such a manner to minimize flexural distortion of said flat surface.

3. The system of claim 1 wherein the drive mechanism scans the macroscopic mirror at a scanning rate of approximately 100 Hz.

4. The system of claim 1 wherein the mirror drive mechanism scans the macroscopic mirror through a scan angle of at least 30° peak to peak.

5. The system of claim 1 wherein the macroscopic mirror operates to reflect a large beamwidth of laser energy through a predetermined pattern and to receive backscatterings from the laser energy.

6. The system of claim 1 wherein the mirror drive mechanism comprises a resonant scanner.

* * * * *